(12) United States Patent
Wong

(10) Patent No.: US 8,874,130 B2
(45) Date of Patent: Oct. 28, 2014

(54) METHOD AND APPARATUS FOR DYNAMIC POWER SAVINGS BASED ON LOCATION

(75) Inventor: Yoon Kean Wong, Redwood City, CA (US)

(73) Assignee: Qualcomm Incorporated, San Diego, CA (US)

(*) Notice: Subject to any disclaimer, the term of this patent is extended or adjusted under 35 U.S.C. 154(b) by 286 days.

(21) Appl. No.: 12/872,572

(22) Filed: Aug. 31, 2010

(65) Prior Publication Data

US 2012/0052873 A1    Mar. 1, 2012

(51) Int. Cl.
*H04W 24/00* (2009.01)
*H04W 52/02* (2009.01)
*H04M 1/725* (2006.01)
*H04W 4/02* (2009.01)

(52) U.S. Cl.
CPC ............ *H04W 52/0251* (2013.01); *Y02B 60/50* (2013.01); *H04M 1/72572* (2013.01); *H04W 4/021* (2013.01)
USPC ........................................ 455/456.1; 455/572

(58) Field of Classification Search
USPC ................. 455/403, 435.1–2, 436, 440, 444, 455/456.1; 370/228, 331, 338, 330
See application file for complete search history.

(56) References Cited

U.S. PATENT DOCUMENTS

| | | | |
|---|---|---|---|
| 7,260,399 B1* | 8/2007 | Oh et al. | 455/436 |
| 7,907,945 B2* | 3/2011 | Deprun | 455/432.1 |
| 2006/0063560 A1* | 3/2006 | Herle | 455/552.1 |
| 2007/0002813 A1* | 1/2007 | Tenny et al. | 370/338 |
| 2010/0246461 A1* | 9/2010 | Hsieh et al. | 370/311 |
| 2010/0291907 A1* | 11/2010 | MacNaughtan et al. | 455/414.1 |
| 2010/0304794 A1* | 12/2010 | Beninghaus et al. | 455/574 |
| 2011/0269476 A1* | 11/2011 | Kumar | 455/456.1 |

* cited by examiner

Primary Examiner — Cong Tran
(74) Attorney, Agent, or Firm — Kilpatrick Townsend & Stockton LLP

(57) ABSTRACT

Techniques to dynamically manage power for a mobile computing device based on a location of the device are described. For example, a mobile computing device may comprise one or more wireless transceivers, a location module operative to monitor one or more location parameters for the mobile computing device, and a power management module operative to dynamically enable or disable one or more of the wireless transceivers based on a comparison of the one or more location parameters and information from a wireless communication technology database. Other embodiments are described and claimed.

20 Claims, 4 Drawing Sheets

100

200

| Connection Tech 1 | Feature 1 | Feature 2 | Feature 3 | Feature n |
|---|---|---|---|---|
| Location 1 | ✓ | ✓ | | ✓ |
| Location 2 | ✓ | ✓ | | |
| Location 3 | | ✓ | ✓ | ✓ |
| Location 4 | | ✓ | | ✓ |
| Location m | | | ✓ | ✓ |

| Connection Tech 2 | Feature 1 | Feature 2 | Feature 3 | Feature n |
|---|---|---|---|---|
| Location 1 | ✓ | ✓ | | ✓ |
| Location 2 | | | | |
| Location 3 | | ✓ | | |
| Location 4 | | | | |
| Location p | | | ✓ | ✓ |

*FIG. 2*

METHOD AND APPARATUS FOR DYNAMIC POWER SAVINGS BASED ON LOCATION

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth. In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing such an array of functionality in a single device may require one or more wireless transceivers. Each wireless transceiver may be associated with one or more wireless communication technologies and each may each consume device power. When the device is operated in an area in which fewer than all of the available wireless communication technologies are available, operating each wireless transceiver may consume device power unnecessarily. It may be advantageous to disable one or more unavailable or underperforming wireless transceivers to conserve power, improve performance and improve the user experience based on a location of the device if it known that certain wireless communication technologies are not available at that location. As a result, it is desirable to enhance the dynamic selection, enabling or disabling of wireless communications technologies or wireless transceivers. For example, it may be advantageous to dynamically disable a wireless communication technology or wireless transceiver based on a location of a mobile computing device and information from a wireless communication technology database. Consequently, there exists a substantial need for techniques to improve the management of mobile computing device power consumption based on wireless transceivers or wireless communication technologies.

BRIEF DESCRIPTION OF THE DRAWINGS

FIG. 2 illustrates one embodiments of a database.

DETAILED DESCRIPTION

Figure 1:
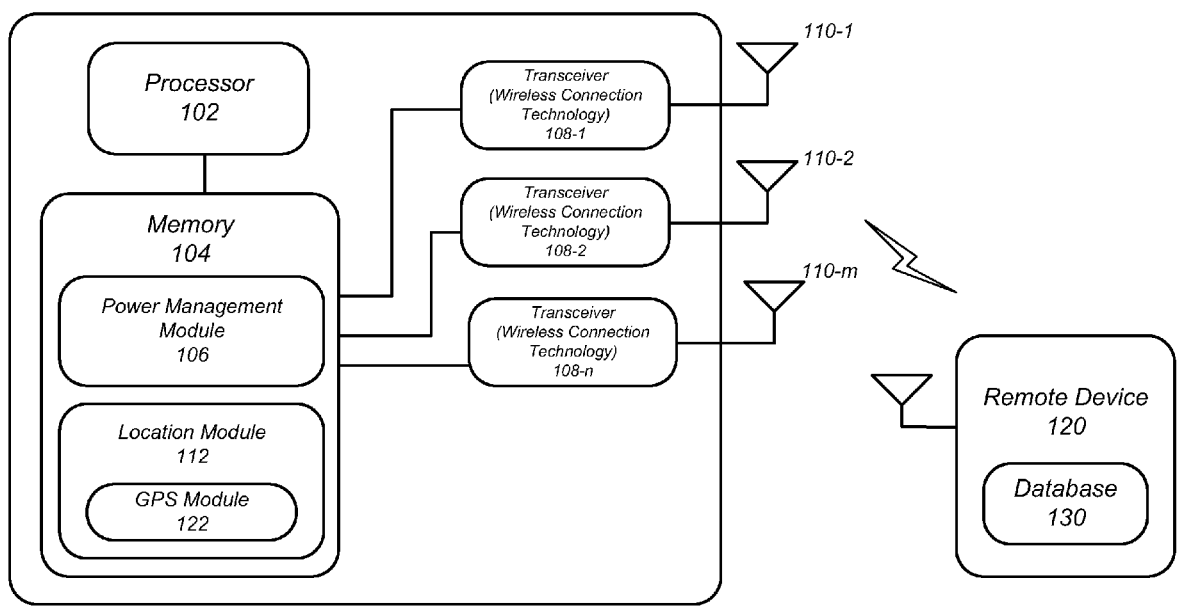
FIG. 1 illustrates one embodiment of a first mobile computing device.

Various embodiments may be generally directed to power management techniques for a mobile computing device, such as a smart phone. Some embodiments may be particularly directed to dynamically enabling or disabling one or more wireless transceivers of a mobile computing device based on a comparison of one or more location parameters associated with the mobile computing device and information from a wireless communication technology database.

In one embodiment, for example, a mobile computing device may include a power management module. In various embodiments, the power management module may be operative to access a wireless communication technology database, compare feature set information for one or more wireless communication technologies based information from the database and based on a location of the mobile computing device, determine that one or more wireless communications technologies are unavailable or do not provide a sufficient quality of service (QoS) at the location, and selectively and dynamically enable or disable one or more of the wireless transceivers based on the comparison.

Examples of information included in the wireless communication database may include but are not limited to one or more of location parameters, network parameters, system parameters, network availability, signal quality, signal strength, connection speed, connection type, connection specification, cost of connection, a list of available voice services, a transmission quality parameter, a reliability parameter, a communication protocol, a device capability, a voice service feature, cost value, a power parameter, user preference, a location, a calling region, and so forth.

Other examples of communication parameters may include without limitation a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for a radio, transceiver or wireless communication technology implemented by a mobile computing device. The embodiments are not limited in this context.

The terms wireless network, wireless transceiver(s) and wireless connection technology are interchangeable as used hereinafter.

Dynamically disabling one or more wireless transceivers based on location information and information from a wireless communication technology database may provide several advantages. For example, by disabling a wireless transceiver associated with a connection technology that is not available at a current location, device power may be conserved. If a user is in an area where it known based on information in the wireless communication technology database that a Wi-Fi connection is not available, for example, it may be advantageous for the mobile computing device to automatically and/or dynamically disable the wireless transceiver associated with Wi-Fi connections in order to prevent time outs and to conserve power associated with the device continually scanning for a Wi-Fi network. This may be accomplished, in some embodiments, by comparing information obtained from a wireless communication technology database with a location of the mobile computing device.

Present implementations for conserving power for a mobile computing device include decreasing a polling period for a wireless communication technology when the device is located in a area with low coverage. For example, a device may determine that the signal strength for a particularly wireless communication technology is low and may, in turn, reduce the polling period for that technology. While this approach may result in some reduced power consumption, additional power could be saved by dynamically disabling the wireless communication technology. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus. In particular, FIG. 1 shows a first embodiment of a mobile computing device 100. The mobile computing device 100 may include by way of example and not limitation a processor 102, a memory 104, a power management module 106, a location module 112, a GPS module 122, transceivers/wireless connection technologies 108-1-n and antennas 110-1-m. FIG. 1 also shows a remote device 120 including a database 130 that may be capable of or operative to communicate with or otherwise interact with mobile computing device 100 in some embodiments. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/ PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

Similarly, in various embodiments, remote device 120 may comprise a wireless communication device similar to mobile computing device 100 that may be generally configured to support or provide cellular voice communication, wireless data communication and computing capabilities. For example, remote device 120 may comprise a second mobile computing device, a router, a node B, cellular interface, gateway, switch or other network device capable of wirelessly communicating with mobile computing device 100. Other embodiments are described and claimed.

The mobile computing device 100 may include a processor 102 coupled to the power management module 106 in some embodiments. The processor 102 may be operative to execute the power management module 106. The mobile computing device 100 may further include a memory 104 coupled to the processor 102. The memory 104 may be operative to store the power management module 106 and the location module 112. Other embodiments are described and claimed.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise a computer-readable media such as volatile or non-volatile memory units arranged to store programs and data for execution by the processor 102. In some embodiments, the computer-readable media, memory or other storage device may comprise a non-transitory storage device. As depicted in FIG. 1, the memory 104 may store a power management module 106 and location module 112 in the form of executable program instructions, code or data. The processor 102 may retrieve and execute the program instructions, code or data from the memory 104 to control or provide dynamic power management operations for the mobile computing device 100. Although the power management module 106 and location module 112 are shown as part of the memory 104 for execution by the processor 102, it may be appreciated that power management module 106 and/or location module 112 may be stored and executed by other memory and processing resources available to the mobile computing device 100. Further, although power management module 106 and location module 112 are depicted as software executed by a processor, it may be appreciated that the operations for power management module 106 and/or location module 112 may be implemented in hardware as well using one or more integrated circuits, for example. The embodiments are not limited in this context.

The mobile computing device 100 may include one or more modules, such as transceiver (connection technology) modules 108-1-n and/or antennas 110-1-m, arranged to communicate information over one or more types of wireless communication links and/or wireless networks. Examples of a wireless communication links and/or wireless networks may include, without limitation, a radio channel, infrared channel, radio-frequency (RF) channel, WiFi channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers") 108-1-n, radios, chipsets, amplifiers, filters, control logic, network interface cards (NICs), antennas 110-1-m, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Other embodiments are described and claimed.

In various embodiments, the location module 112 may comprise a Global Positioning System (GPS) or GPS module 122, compass, cellular triangulation logic, dead reckoning logic, relative positioning logic or any other suitable device or logic operative to monitor location parameters for mobile computing device 100 to determine a location of the mobile computing device 100. Location parameters may include a current location, speed or direction of movement or any other suitable parameter used for determining a current or future location of mobile computing device 100.

In some embodiments, the location of the mobile computing device 100 may comprise a current location. For example, location module 112 may be operative to determine the current location of the mobile computing. In various embodiments, the location may comprise one or more anticipated locations of the mobile computing device. In some embodiments the location module 112 may be operative to estimate the one or more anticipated locations of the mobile computing device 100 using one or more of a global positioning system (GPS), a compass, a GPS history, a known destination location or address or a direction and/or speed of movement of the mobile computing device 100. For example, mobile computing device 100 may include a GPS module 122 operative to report a current location of the mobile computing device 100 to the connection location module 112, and to also report one or more anticipated future locations of the mobile computing device 100 based on an address entered by the user for use in determining directions to a known location.

In various embodiments, power management module 106 may be configured to and/or operative to dynamically enable or disable one or more of the wireless transceivers or wireless connection technologies 108-1-$n$ based on a comparison of the one or more location parameters received from the location module 112 and information from a wireless communication technology database. In some embodiments, the wireless communication technology database may be stored locally on mobile computing device 100 in memory 104, for example. In a preferred embodiment, the power management module 106 may be operative to request and receive the wireless communication technology database 130 from a remote device, such as remote device 120 for example.

The wireless communication technology database 130 may comprise one or more lists of correlated location information and wireless communication technology information generated in some embodiments. One example of a wireless communication technology database 130 is shown and discussed in more detail with reference to FIG. 2.

In some embodiments, the wireless communication technology database 130 may be generated or populated with data by one or more users of the one or more wireless communication technologies, one or more service providers or one or more mobile computing device manufacturers. For example, the database 130 may be populated over time by data uploaded by users (e.g. crowd sourced) regarding available wireless connections at certain locations. Similarly, device manufacturers may generate the database 130 and load the database 130 on any number or type of wireless devices that may be available in a wireless network or area. In some embodiments, wireless communication service providers may generate and make available the database 130 on any number or type of network components. In various embodiments, the coverage database may be populated with information that is learned by each device over time through use in a variety of locations. The information in the coverage database may map a given location to coverage information for different services, carriers or wireless connection technologies at that location. Other embodiments are described and claimed.

In various embodiments, the information contained in the wireless communication technology database 130 may comprise one or more communications parameters comprising one or more of wireless communication technology availability, signal strength, bandwidth or cost. For example, the information may comprise any parameter that are suitable to assist in determining whether or not a wireless communication technology is available in a particular location and/or whether or not the wireless communication technology provides a threshold QoS at the location. In some embodiments, each database 130 may include information on multiple locations or multiple databases 130 may be provided for multiple locations with each database corresponding to a particular location. Other embodiments are described and claimed.

The one or more wireless communication technologies may comprise one or more of cellular, Wi-Fi, wireless local area network (WLAN), wireless metropolitan area network (WMAN) or personal area network (PAN) communication technologies in some embodiments. For example, the database may contain information regarding the availability and quality (or other factors) relating to a cellular voice connection, a cellular data connection, and a Wi-Fi connection in some embodiments. While a limited number of connection technologies and connection parameters for a limited number of uses are described herein for purposes of illustration, it should be understood that any suitable connection technology, wireless communication technology, wireless network, standard or communication protocol could be used to establish any type of wireless connection and still fall within the described embodiments.

In various embodiments, the power management module 106 may be operative to dynamically disable one or more of the wireless transceivers 108-1-$n$ if one or more wireless communication technologies associated with the one or more wireless transceivers is not available or does not provide a quality of service (QoS) above a predefined threshold at a location determined using the one or more location parameters. For example, the power management module 106 may be configured to compare the location of the mobile computing device 100 with information from database 130 regarding wireless communication technologies at that location. For example, power management module 106 may determine that a Wi-Fi connection is not available at the current location of the mobile computing device 100 and may disable a wireless transceiver associated with Wi-Fi connections to conserve device power.

In some embodiments, the power management module 106 may be operative to periodically request one or more location parameters from the location module 112 and perform the comparison with the information from the wireless communication technology database 130 after a predetermined time period or after the mobile computing device has been moved a predetermined distance. For example, mobile computing device 100 may include a default time after a transceiver 108-1-$n$ has been disabled until a new or updated database 130 is obtained and a new comparison is performed. In some embodiments, the time period may be network specified, device specific or user configurable. Similarly, mobile computing device 100 may include a default distance after a transceiver 108-1-$n$ has been disabled until a new or updated database 130 is obtained and a new comparison is performed. For example, a user may being walking or riding in a motor vehicle with their mobile computing device 100 and may enter an area in which the previous information obtained from database 130 is no longer applicable. As a result, it may be desirable to obtain a new or updated database 130 and perform a new comparison after a mobile computing device 100 has traveled, moved or otherwise been relocated a certain distance. The distance may be a default distance, a user configurable distance or the distance may be calculated based on knowledge of available connections in an area surrounded the original location of the mobile computing device. Other embodiments are described and claimed.

In some embodiments, power management module 106 may comprise or include an algorithm for performing the comparison based on the database 130 information. In various embodiments, the power management module 106 may be configured to execute an algorithm to generate an expected quality of service (QoS) or service matrix for each connection technology, wireless network or carrier and may select a connection technology or wireless network to be disabled based on the expected QoS or switching matrix. For example, the algorithm may include any of the above or any other factors relevant to establishing a wireless connection using one of a plurality of available connection technologies 108-1-n. In some embodiments, the expected QoS and/or service matrix may be based on one or more performance or cost metrics for each available connection technology 108-1-n. Other embodiments are described and claimed.

In various embodiments, the power management module 106 may be configured to automatically initiate a wireless connection with one or more target devices using a connection technology or wireless network that is not or will not be disabled based on the comparison. For example, after performing the dynamic disabling of one or more unavailable or underperforming network technologies, mobile computing device 100 may automatically initiate or establish a wireless connection using any one or more of the remaining connection technologies.

A power management preference/application may comprise one or more visible user interfaces for ease of use in some embodiments. For example, the application may comprise a simple interface allowing a user to enable or disable the dynamic power management feature, and to select preferences for establishing connections, including time, distance and/or feature preferences for one or more wireless networks. Preferences may include, for example, ranking of items by importance to the user, such as cost, quality, processing impact or any other factor. In some embodiments, an underlying or hidden layer may be configured for decision making. For example, the algorithm described above may comprise the underlying layer.

In various embodiments, the power management module 106 may be configured to monitor any selected connection technologies or wireless networks after a connection has been established. For example, mobile computing device 100 may establish a connection with a wireless network or remote device 120 using a dynamically selected connection technology and the power management module 106 may, thereafter, continue to monitor to the established connection as well as other available connections. In some embodiments, the power management module 106 may be configured to automatically disable one of the one or more connection technologies based on changes in system, network, or other parameters. For example, if the power management module 106 determines that a connection technology has become unavailable or has degraded in quality, an additional disabling may occur. The additional steps may be transparent to the user in some embodiments in that the disabling may occur in the background without dropping an existing call or data connection, for example. The embodiments are not limited in this context.

FIG. 2 illustrates one embodiment of a database 200 which may be the same or similar to wireless communication technology database 130. Database 200 may include, in some embodiments, a table for a first communication technology (e.g. communication technology 1) and a table for a second communication technology (e.g. communication technology 2). While a limited number of communications technologies, connections and features are shown for purposes of illustration, it should be understood that any number or type of connection technologies, features and locations could be used and still fall within the described embodiments. Furthermore, it should also be understood that the particular arrangement of information in FIG. 2 is presented or purposes of illustration and not limitation. Any suitable arrangement of information could be used and still fall within the described embodiments.

As shown in database 200, each table representing connection information for communication technologies 1 and 2 may include different features and locations representing whether or not a particular feature is available in a particular location. For example. Connection technology 1 may include features 1-n. In some embodiments, connection technology 1 includes features 1, 2 and n at location 1, features 1 and 2 at location 2, features 2, 3 and n at location 3, features 2 and n at location 4, and features 3 and n at location m. In various embodiments, power management module 106 may use this information to determine which of one or more wireless transceivers can be disabled. For example, if it is determined that mobile computing device 100 is operating at location 1, a wireless transceiver or wireless communication technology associated with feature 3 may be disabled.

Database 200 represents a simplified version of a sample wireless communication technology database and simply illustrates whether or not a particular feature is available at a particular location. In some embodiments, database 200 may additionally include information concerning the strength or quality of one or more features or connection, or any other suitable information. Other embodiments are described and claimed.

In various embodiments the database 200 may be stored on a computer-readable storage medium of the mobile computing device or it may be stored on one or more remote device, one or more devices of the wireless networks or a home wireless network and may be wirelessly accessible by the mobile computing device 100. The computer-readable storage medium that contains the database and the feature set information may comprise a subscriber identity module (SIM) of the mobile computing device 100 in some embodiments. In various embodiments, the feature set information may be preconfigured or preloaded and stored on the SIM by a home wireless network provider or by a user of the mobile computing device. For example, a home wireless network provider may preload a SIM with roaming wireless network information, including feature set information for the roaming wireless networks or carriers. In some embodiments, a user of mobile computing device 100 may additionally or alternatively have the option of updating, changing or otherwise amending the database to reflect changes in roaming wireless networks or to reflect user preferences.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 3:
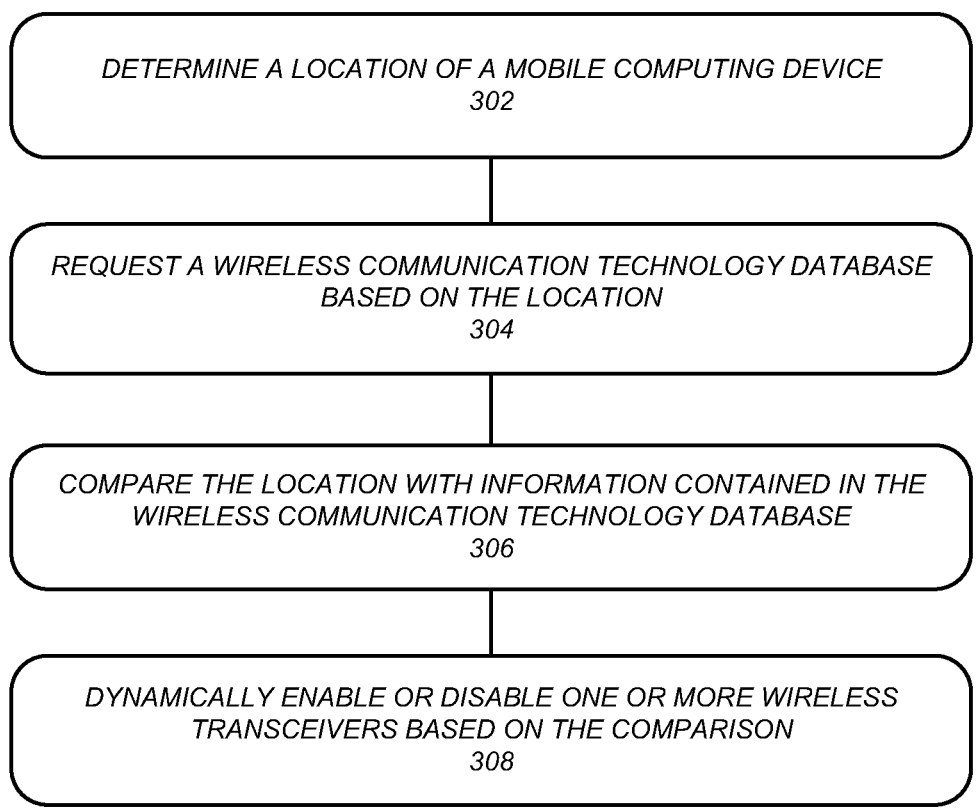
FIG. 3 illustrates one embodiment of a logic diagram.

FIG. 3 illustrates one embodiment of a logic diagram. In particular, FIG. 3 illustrates a logic diagram 300, which may be representative of the operations executed by one or more embodiments described herein. FIG. 3 illustrates an embodiment of a power management process for mobile computing device 100 including a power management module 106, for example.

In some embodiments, a location of a mobile computing device may be determined at 302. For example, location module 112 may be used to determine a current or estimated future location of mobile computing device 100. At 304, a wireless communication technology database may be requested based on the location. For example, power management module 106 may request database 130 from remote device 120 based on a determined location of mobile computing device 100.

At 306, in various embodiments, the location may be compared with information contained in the wireless communication technology database. For example, power management module 106 may include an algorithm configured to compare the location of mobile computing device 100 with connection information contained in database 130 to determine what communication technologies are available at that location. In various embodiments, one or more wireless transceivers may be dynamically enabled or disabled based on the comparison at 308. For example, power management module 106 may determined, based on the information in the database 130 and the location of the mobile computing device determined and retrieved from location module 112, that one or more of wireless connection technologies 108-1-n are not available at a particular location, and may disable the associated wireless connection technology 108-1-n to conserve power for mobile computing device 100. Other embodiments are described and claimed.

In some embodiments, the wireless communication technology database may be requested from a remote device. For example, mobile computing device 100 and/or power management module 106 may request database 130 from remote device 120. In other embodiments, the wireless communication technology database may be requested from a memory of the mobile computing device. For example, the database 130 may be stored in memory 104 or any other suitable memory of mobile computing device 100.

A determination may be made as to whether or not one or more wireless communication technologies associated with the one or more wireless transceivers is available at the location in various embodiments. For example, power management module 106 may determine, based on information in database 130, that one or more of transceivers 108-1-n is not available at a particular location. In some embodiments, a determination may be made as to whether or not one or more wireless communication technologies associated with the one or more wireless transceivers provides a quality of service (QoS) above a predefined threshold at the location. For example, power management module 106 may determine that one or more of transceivers 108-1-n are associated with a connection in a particular location that will not provide an adequate level of services. Based on these determination, in various embodiments, the one or more of the wireless transceivers or more wireless communication technologies associated with connections or services that are not available at the location or do not provide a quality of service (QoS) above the predefined threshold may be disabled. Other embodiments are described and claimed.

In some embodiments, a time period may be measured or a distance that the mobile computing has traveled may be calculated since a last request for a wireless communication technology database. For example, power management module 106 may be operative to track how long it has been or how far mobile computing device 100 has traveled since a last database 130 has been acquired or since a last check regarding the status of available connections has been performed. In some embodiments, an updated wireless communication technology database may be requested if a predetermined amount of time has lapsed or a predetermined distance has been traveled. Other embodiments are described and claimed.

Figure 4:
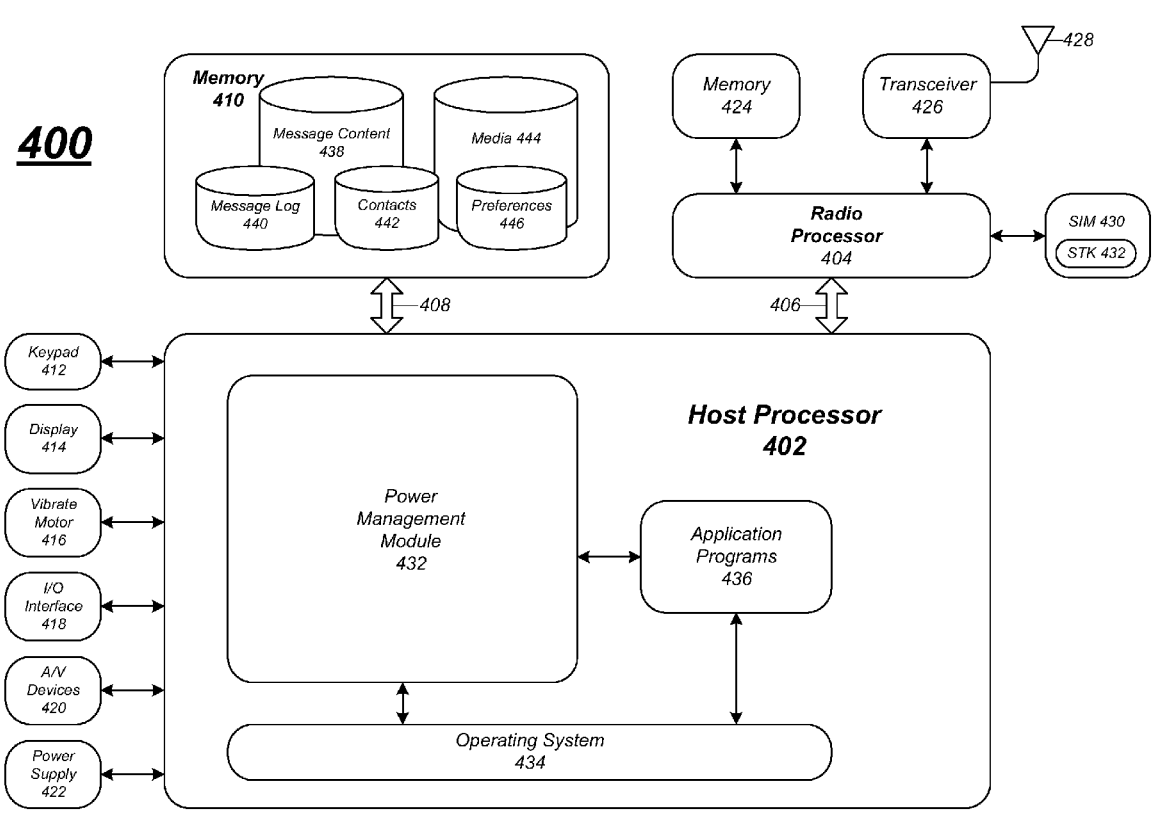
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 16-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth, similar to transceivers/connection technologies 108-1-*n* of FIG. 1. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals, similar to antennas 110-1-*m* of FIG. 1. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Palm WebOS®, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a power management module 432. The power management module 432 may be the same or similar to the power management module 106 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a plurality of wireless transceivers;
   a location module operative to monitor one or more location parameters for the mobile computing device, wherein the one or more location parameters comprise at least an estimated future location for a mobile computing device; and
   a power management module operative to dynamically disable a first transceiver of the plurality of wireless transceivers for a first connection technology and enable a second transceiver of the plurality of wireless transceivers for a second connection technology based on a comparison of the one or more location parameters and information from a wireless communication technology database.

2. The mobile computing device of claim 1, wherein the power management module is operative to dynamically disable one or more of the plurality of wireless transceivers if one or more wireless communication technologies associated with the one or more of the plurality of wireless transceivers is not available or does not provide a quality of service (QoS) above a predefined threshold at a location determined using the one or more location parameters.

3. The mobile computing device of claim 1, wherein the power management module is operative to periodically request one or more location parameters from the location module and perform the comparison with the information from the wireless communication technology database after a predetermined time period or after the mobile computing device has been moved a predetermined distance.

4. The mobile computing device of claim 1, wherein the wireless communication technology database comprises one or more lists of correlated location information and wireless communication technology information generated by one or more users of the one or more wireless communication technologies, one or more service providers or one or more mobile computing device manufacturers.

5. The mobile computing device of claim 4, wherein the wireless communication technology information comprises one or more communications parameters comprising one or more of wireless communication technology availability, signal strength, bandwidth or cost.

6. The mobile computing device of claim 4, wherein the one or more wireless communication technologies comprise one or more of cellular, Wi-Fi, wireless local area network (WLAN), wireless metropolitan area network (WMAN) or personal area network (PAN) communication technologies.

7. The mobile computing device of claim 1, wherein the estimated future location for the mobile computing device is determined using one or more of global position system (GPS), wireless triangulation, dead reckoning or relative positioning.

8. The mobile computing device of claim 1, wherein the power management module is operative to request and receive the wireless communication technology database from a remote device.

9. The mobile computing device of claim 1, comprising:
   one or more memory modules to store the wireless communication technology database.

10. A computer-implemented method, comprising:
    determining an estimated future location of a mobile computing device;
    requesting a wireless communication technology database based on the estimated future location;
    comparing the estimated future location with information contained in the wireless communication technology database;
    dynamically disabling a first transceiver of a plurality of wireless transceivers for a first connection technology based on the comparison; and
    dynamically enabling a second transceiver of the plurality of wireless transceivers for a second connection technology based on the comparison.

11. The computer-implemented method of claim 10, comprising:
    determining if one or more wireless communication technologies associated with the one or more of the plurality of wireless transceivers is available at the estimated future location;
    determining if the one or more wireless communication technologies associated with the one or more of the plurality of wireless transceivers provides a quality of service (QoS) above a predefined threshold at the estimated future location; and
    dynamically disabling the one or more of the plurality of wireless transceivers if the one or more wireless communication technologies associated with the one or more wireless transceivers is not available at the estimated future location or does not provide a quality of service (QoS) above the predefined threshold.

12. The computer-implemented method of claim 10, comprising:
    measuring a time period or calculating a distance that the mobile computing has traveled since a last request for a wireless communication technology database; and
    requesting an updated wireless communication technology database if a predetermined amount of time has lapsed or a predetermined distance has been traveled.

13. The computer-implemented method of claim 10, wherein the wireless communication technology database comprises one or more lists of correlated location information and wireless communication technology information generated by one or more users of the one or more wireless communication technologies, one or more service providers or one or more mobile computing device manufacturers and wherein the wireless communication technology information comprises one or more communications parameters comprising one or more of wireless communication technology availability, signal strength, bandwidth or cost.

14. The computer-implemented method of claim 10, comprising:
   requesting the wireless communication technology database from a remote device.

15. The computer-implemented method of claim 10, comprising:
   requesting the wireless communication technology database from a memory of the mobile computing device.

16. An article of manufacture comprising a computer-readable storage medium containing instructions that when executed by a processor enable a system to:
   determine an estimated future location of a mobile computing device;
   request a wireless communication technology database based on the estimated future location;
   compare the estimated future location with information contained in the wireless communication technology database;
   dynamically disable a first transceiver of a plurality of wireless transceivers for a first connection technology based on the comparison; and
   dynamically enable a second transceiver of the plurality of wireless transceivers for a second connection technology based on the comparison.

17. The article of manufacture of claim 16, comprising instructions that when executed by the processor enable the system to:
   determine if one or more wireless communication technologies associated with the one or more of the plurality of wireless transceivers is available at the estimated future location;
   determine if the one or more wireless communication technologies associated with the one or more of the plurality of wireless transceivers provides a quality of service (QoS) above a predefined threshold at the estimated future location; and
   dynamically disable the one or more of the plurality of wireless transceivers if the one or more wireless communication technologies associated with the one or more of the plurality of wireless transceivers is not available at the estimated future location or does not provide a quality of service (QoS) above a predefined threshold.

18. The article of manufacture of claim 16, comprising instructions that when executed by the processor enable the system to:
   measure a time period or calculate a distance that the mobile computing device has traveled since a last request for a wireless communication technology database; and
   request an updated wireless communication technology database if a predetermined amount of time has lapsed or a predetermined distance has been traveled.

19. The article of manufacture of claim 16, wherein the wireless communication technology database comprises one or more lists of correlated location information and wireless communication technology information generated by one or more users of the one or more wireless communication technologies, one or more service providers or one or more mobile computing device manufacturers and wherein the wireless communication technology information comprises one or more communications parameters comprising one or more of wireless communication technology availability, signal strength, bandwidth or cost.

20. The article of manufacture of claim 10, comprising instructions that when executed by the processor enable the system to:
   request the wireless communication technology database from a remote device; and
   store the wireless communication technology database in a memory of the mobile computing device.

* * * * *